(12) United States Patent
Haran (10) Patent No.: US 10,965,235 B2
(45) Date of Patent: Mar. 30, 2021

(54) HIGH FREQUENCY ELECTRIC MOTOR, CONTROL SYSTEM, AND METHOD OF MANUFACTURE

(71) Applicant: University of Illinois at Urbana-Champaign, Urbana, IL (US)

(72) Inventor: Kiruba Sivasubramaniam Haran, Champaign, IL (US)

(73) Assignee: UNIVERSITY OF ILLINOIS AT URBANA-CHAMPAIGN, Urbana, IL (US)

( * ) Notice: Subject to any disclaimer, the term of this patent is extended or adjusted under 35 U.S.C. 154(b) by 250 days.

(21) Appl. No.: 15/938,267

(22) Filed: Mar. 28, 2018

(65) Prior Publication Data
US 2018/0287437 A1 Oct. 4, 2018

Related U.S. Application Data

(60) Provisional application No. 62/479,556, filed on Mar. 31, 2017.

(51) Int. Cl.
*H02K 3/47* (2006.01)
*H02K 3/32* (2006.01)
*H02P 23/00* (2016.01)
*B60K 7/00* (2006.01)
*H02K 1/16* (2006.01)
(Continued)

(52) U.S. Cl.
CPC ............... *H02P 23/00* (2013.01); *B60K 7/00* (2013.01); *H02K 1/16* (2013.01); *H02K 1/185* (2013.01); *H02K 1/187* (2013.01); *H02K 1/2773* (2013.01); *H02K 3/30* (2013.01); *H02K 3/47* (2013.01); *H02K 7/14* (2013.01);

*H02K 15/12* (2013.01); *B60K 2001/006* (2013.01); *H02K 9/02* (2013.01); *H02K 9/19* (2013.01);
(Continued)

(58) Field of Classification Search
CPC .......... H02K 3/47; H02K 1/16; H02K 15/12; H02K 7/14; H02K 1/185; H02K 1/187; H02K 3/30; H02K 1/2773; H02K 9/02; H02K 9/19; H02K 2213/03; H02P 23/00; H02P 27/14; H02P 2201/07; B60K 7/00; B60K 2001/006; Y02T 50/44
USPC .................... 310/43, 45, 67 R, 208, 216.002
See application file for complete search history.

(56) References Cited

U.S. PATENT DOCUMENTS

| | | | | |
|---|---|---|---|---|
| 5,606,791 A * | 3/1997 | Fougere | ................... | H02K 3/47 |
| | | | | 29/596 |
| 2004/0017125 A1* | 1/2004 | Nakamura | ............. | H02K 9/005 |
| | | | | 310/201 |

(Continued)

OTHER PUBLICATIONS

Zhang et al.; High-Specific-Power Electric Machines for Electrified Transportation Applications—Technology Options; Energy Conversion Congress and Exposition (ECCE), 2016 IEEE; published Sep. 18, 2016; 13pp.

(Continued)

*Primary Examiner* — Thomas Truong (57) ABSTRACT

An electric motor can include a stator including a plurality of air-gap wound coils supported by a yoke, and a rotor including a permanent magnet array. The air-gap wound coils can be impregnated with a resin containing a plurality of particles, such as ceramic nanoparticles or iron particles. A corresponding control system for an electric motor can include a boost converter, and a reconfigurable multilevel inverter.

17 Claims, 10 Drawing Sheets

(51) Int. Cl.
    *H02K 15/12*     (2006.01)
    *H02K 7/14*     (2006.01)
    *H02K 1/18*     (2006.01)
    *H02K 3/30*     (2006.01)
    *H02K 1/27*     (2006.01)
    *H02P 27/14*     (2006.01)
    *H02K 9/02*     (2006.01)
    *H02K 9/19*     (2006.01)
    *B60K 1/00*     (2006.01)

(52) U.S. Cl.
    CPC .......... *H02K 2213/03* (2013.01); *H02P 27/14* (2013.01); *H02P 2201/07* (2013.01); *Y02T 50/40* (2013.01)

(56) References Cited

U.S. PATENT DOCUMENTS

| | | | | |
|---|---|---|---|---|
| 2004/0041409 | A1* | 3/2004 | Gabrys | H02K 7/1838 290/55 |
| 2004/0263099 | A1* | 12/2004 | Maslov | B60L 50/66 318/400.24 |
| 2007/0138876 | A1* | 6/2007 | Evans | H02K 1/148 310/10 |
| 2012/0080970 | A1* | 4/2012 | Yin | H02K 3/30 310/87 |
| 2013/0157042 | A1* | 6/2013 | Brockschmidt | H01B 3/004 428/329 |
| 2013/0301314 | A1* | 11/2013 | Fu | H02M 7/487 363/37 |
| 2014/0111052 | A1* | 4/2014 | Wu | H02K 15/03 310/156.28 |

OTHER PUBLICATIONS

Arkkio et al.; Induction and Permanent-Magnet Synchronous Machines for High-Speed Applications; Electrical Machines and Systems, 2005, ICEMS 2005; published Sep. 27, 2004; 6pp.

Tenconi et al; Electrical Machines for High-Speed Applications; Design Considerations and Tradeoffs; IEEE Transactions on Industrial Electronics, vol. 61, No. 6, Jun. 2014; 8pp.

\* cited by examiner

HIGH FREQUENCY ELECTRIC MOTOR, CONTROL SYSTEM, AND METHOD OF MANUFACTURE

RELATED APPLICATIONS

This application claims priority to U.S. Provisional Patent Application No. 62/479,556 which was filed Mar. 31, 2017 and is incorporated herein by reference.

BACKGROUND

Electrical machines convert electrical energy into mechanical energy, or vice versa, and typically consist of a rotor and a stator. The rotor is generally a moving component that can rotate relative to the stator to generate useful force. In conventional arrangements, magnetic fields formed between the rotor and stator interact to generate torque on a rotor shaft, which can be used to drive mechanical devices.

There is a growing interest in applying electric motors to transportation applications such as electric vehicles and airplanes. An important concern for these type of applications (and others) is reducing weight and material use, while still obtaining efficient operation and appropriate overall performance. Further, for motor vehicle applications a motor capable of producing constant power across a wide speed range is often needed.

SUMMARY

Some embodiments of the invention provide an electric motor with a stator including a plurality of air-gap wound coils supported by a yoke, and a rotor including a permanent magnet array, optionally supported by a retaining ring. The air-gap wound coils, form-wound from finely stranded, transposed conductors, can be impregnated with a resin containing a plurality of particles.

Some embodiments of the invention provide an electric motor that can include armature windings that include Litz wire cables, impregnated with resin containing particles that include at least one of a plurality ceramic nanoparticles and a plurality of iron particles.

Some embodiments of the invention provide a transportation system can include an electric motor mounted within one of a wheel of a vehicle and a turbofan assembly for an aircraft. The electric motor can include a stator including a plurality of air-gap wound coils supported by a yoke, and a rotor including a permanent magnet array. The air-gap wound coils can be impregnated with a resin containing a plurality of particles. A control system for the electric motor can be mounted to the vehicle so as not to be included in an unsprung mass of the vehicle or can be mounted to the aircraft.

Some embodiments of the invention provide a control system for an electric motor. The control system can include a boost converter, and a reconfigurable multilevel inverter. The boost converter can be connected to the reconfigurable multilevel inverter to provide variable DC power. The reconfigurable multilevel inverter can be connected to the electric motor to provide controllable voltage and current.

Some embodiments of the invention provide a transportation system that includes an electric motor and a control system. The electric motor can include a plurality of air-gap wound coils that include wire cables impregnated with a resin containing a plurality of at least of ceramic particles and iron particles, and a magnet array optionally supported by a retaining ring. The control system can include a boost converter, and a reconfigurable multilevel inverter. The boost converter can be connected to the reconfigurable multilevel inverter to provide variable DC power, and the reconfigurable multilevel inverter can be connected to the electric motor to provide controllable voltage and current.

BRIEF DESCRIPTION OF DRAWINGS

The accompanying drawings, which are incorporated in and form a part of this specification, illustrate embodiments of the invention and, together with the description, serve to explain the principles of embodiments of the invention.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

As used herein, unless otherwise specified or limited, "at least one of A, B, and C," and the like, is meant to indicate A, or B, or C, or any combination of A, B, and/or C. As such, these and similar phrases can include single or multiple instances of A, B, and/or C, and, in the case that any of A, B, and/or C indicates a category of elements, single or multiple instances of any of the elements of the categories A, B, and/or C.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

As financial and environmental concerns drive interest in high-efficiency vehicles and other transportation systems, electric motors with a high power density have been identified as potentially important technology. One approach to increasing specific power (or power density), which refers to the amount of power per unit weight, is to at least partly avoid the metal-intense topology of conventional motor design, which can contribute to high motor weight. For example, many conventional traction motors are based on machine topologies that use traditional magnetic circuits with a significant amount of ferromagnetic steel (i.e., a significant amount of iron). Accordingly, these motors can be relatively heavy. Further, due to the use of large amounts of ferromagnetic steel, conventional motors can suffer from relatively significant efficiency losses when operated at high frequencies (e.g., at 1-10 kHz and higher).

Embodiments of the disclosed invention can improve on conventional motor designs by providing relatively light weight, high speed, and high frequency electric motors and related control systems, methods for manufacturing and controlling such motors, and transportation (and other) systems that employ such motors. In particular, some embodiments of the invention can achieve significant improvements over conventional designs through significantly reduced need for ferromagnetic steel, with correspondingly reduced weight, while also providing relatively high power outputs. In this regard, some embodiments of the invention can be particularly useful in aerospace and transportation (e.g., automotive) applications, as well as in various other contexts.

As also discussed above, conventional traction motors and drives can be based on machine topologies that use traditional magnetic circuits with a significant amount of ferromagnetic steel, and relatively modest fundamental frequency. These motors can be relatively heavy and can be subject to iron-based losses, especially at high frequencies.

In contrast, motors according to some embodiments of the invention can be designed to operate at very high fundamental frequencies (e.g., 3-10 kHz or higher), with relatively reduced flux-per-pole, and with minimized use of steel. Such an arrangement, for example, can eliminate a significant source of losses and weight in the machine, as compared to conventional designs, as well as significantly reducing (e.g., minimizing) the requirement for energy buffering components (inductors and capacitors) in the related drive system.

In this regard, it should be noted that fundamental frequency of the motor is directly related to the pole count in the machine, for a given rotor speed. For example, by driving the fundamental frequency of the machine to about ten times conventional frequencies, the pole count for the machine can be correspondingly increased by ten times, thereby reducing the flux per pole by an order of magnitude. Further details concerning increases in pole count, and the reduction of flux per pole is discussed by Yoon, et al., "A high-speed, high-frequency, air-core PM machine for aircraft application," 2016 IEEE Power and Energy Conference at Illinois, which is incorporated herein by reference.

In this light, it has been recognized that increasing the number of poles in an electrical machine can lead to reduced weight, because, for example, an increase in the number of poles (and the corresponding decrease in flux per pole) can allow for a proportional decrease in iron that may be required to carry the magnetic flux. For example, in some conventional motor designs, relatively heavy arrangements of steel teeth, steel laminations, and yokes on the stator and rotor are designed to carry magnetic flux within the machine. As the number of poles for a machine is increased, such as in some embodiments of the invention, the magnetic flux for the machine is distributed across more poles, thereby resulting in less flux per pole. Because less material is therefore needed to carry the flux, some motors according to the invention can be designed to exhibit substantially thinner stator and rotor yokes than conventional motors, as well as less iron generally.

In some embodiments of the invention, weight can be further reduced by implementing air-gap armature winding, which can be used to reduce (e.g., entirely avoid) the reliance on iron teeth and associated slots of a yoke to structurally support the winding. As also discussed below, in some embodiments of the invention, the combined effects of high frequency operation and the use of air-gap windings can allow for substantial elimination of weight, including through the decreased need for structural steel, and decreased need for iron to carry magnetic flux within the machine.

As also discussed below, reduced-iron machines that can be partly enabled by high frequency operation and reduced pole count can be configured to provide superior specific power and lower material costs than conventional machines. However, as the frequency of a relevant machine increases, copper losses within the armature coils due to proximity or skin effects can begin to significantly affect overall efficiency. Accordingly, in particular embodiments, it may be useful to optimize trade-offs between the minimizing of iron content, the amount of permanent magnets required, and the copper losses associated with high frequency machines. Certain approaches to this optimization, including back-filling parts of a machine (e.g., the air-gap windings) with iron or other particles, are also discussed below.

In some embodiments of the invention, aspects of the design can result in the elimination of powerful, but relatively expensive rare-earth magnets. For example, in embodiments utilizing air-core armature windings, although an increase in excitation requirements can sometimes be expected as compared to conventional designs, the combination of reduced armature Ampere-turns/pole and increased reluctances can lead to significantly lower demagnetization fields from the armature currents. In some embodiments, this configuration, alone or in combination with the use of filled resins in the air gap windings (as also discussed below), can allow for the use of non-rare-earth (e.g., non-Dysprosium, non-Neodymium, and non-Terbium) magnets, with a resulting decrease in system cost. In some embodiments, such arrangements can also result in transportation motors with significantly improved performance characteristics.

As another benefit of some embodiments of the invention, a weight reduction approach that minimizes the use of iron can also significantly reduce core losses, such as hysteresis losses and eddy current losses, due to the reduction in total iron in the relevant system. In some embodiments, with core losses having been substantially reduced (e.g., to become a negligible component of the total losses), the machine design can be further optimized to maximize efficiency over a broad operating space by letting the internal bus voltage vary with a two-stage converter.

Figure 1A:
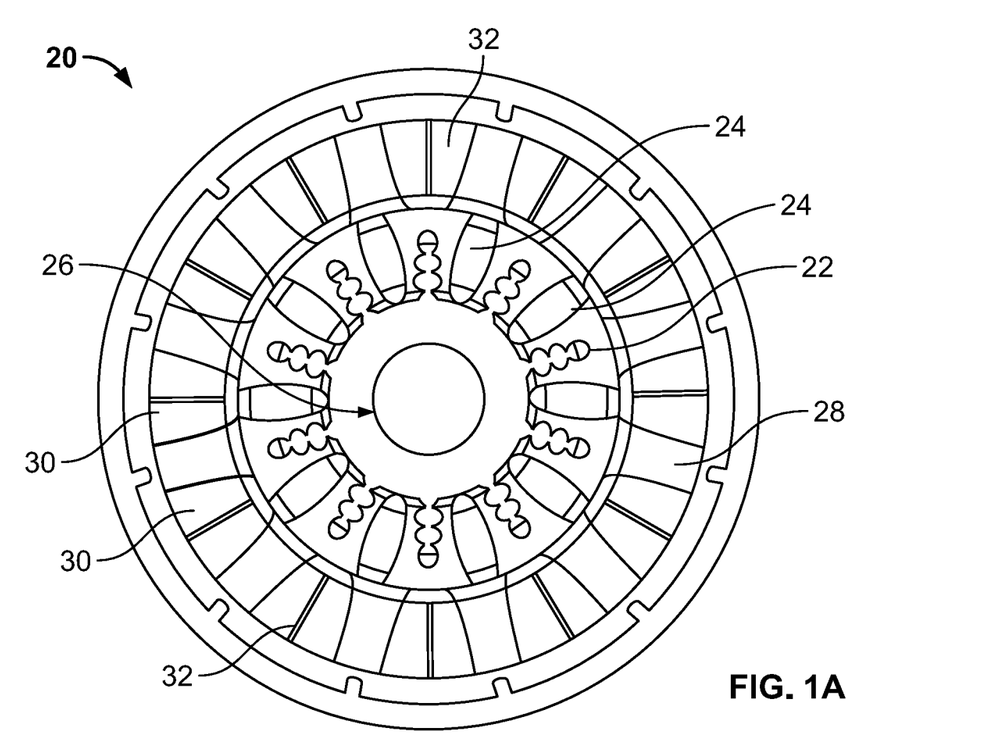
FIGS. 1A and 1B are, respectively, schematic sectional views of a conventional motor design and one embodiment of a motor according to the invention.
Figure 1B:
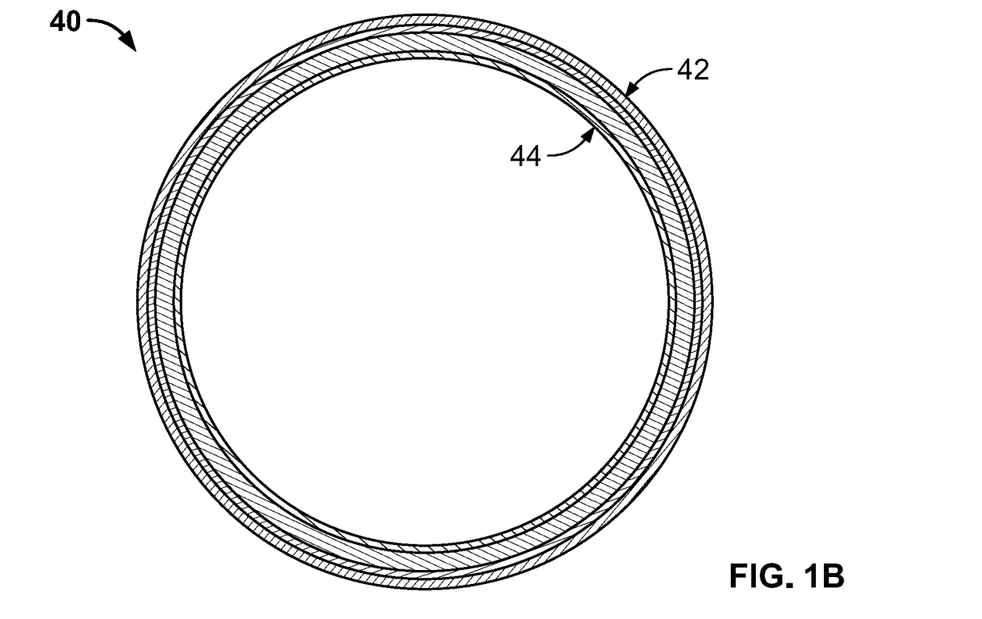

FIGS. 1A and 1B illustrate certain aspects of improvements over conventional designs that can be achieved for some embodiments of the invention. For example, FIG. 1A illustrates a conventional design for an electric motor 20, which includes a rotor 22 that supports rare-earth magnets 24 relative to a shaft 26, and a relatively heavy iron stator 28. The stator 28 includes a number of stator slots 30, which house copper windings 32 of the motor. In contrast, as illustrated in FIG. 1B, a motor 40 according to an embodiment of the invention can use an air-gap winding to help to facilitate a significant reduction in the functional cross-section of the motor as well as other benefits (e.g., enabling the use of non-rare-earth magnets). In particular, the illustrated configuration of the motor 40 includes a relatively thin ring-shaped stator 42 surrounding a relatively thin ring-shaped rotor 44, which can be configured according to principles of this disclosure. In other embodiments, other configurations are possible including, for example, configurations with a ring-shaped rotor outside of a ring-shaped stator.

Figure 2A:
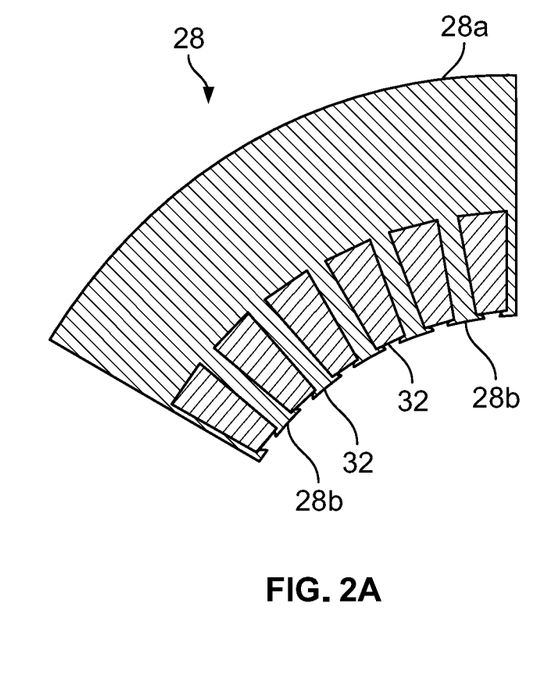
FIGS. 2A and 2B are, respectively, schematic views of example armature and yoke configurations for the motors of FIGS. 1A and 1B.
Figure 2B:
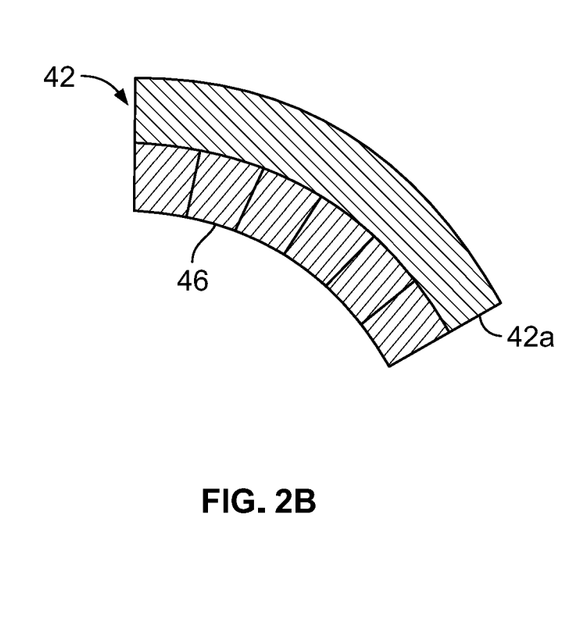

Aspects of comparative improvement of embodiments of the invention relative to conventional designs are further illustrated in FIGS. 2A and 2B. For example, FIG. 2A illustrates the use of the slots 30, as defined by an iron yoke 28a and iron teeth 28b of the stator 28 to support the copper windings 32 of the motor 20 (see also FIG. 1A). In contrast, FIG. 2B illustrates the absence from the motor 40 of teeth similar to the teeth 28b in favor of air-gap winding, and the corresponding reduction in structural iron. In particular, in the embodiment illustrated, a stator yoke 42a supports copper windings 46 without the need for an array of iron teeth. The resulting reduction in structural iron used in the yoke 42a (not necessarily illustrated to scale in FIG. 2) is readily apparent.

Indeed, in some embodiments, a yoke to support armature windings in embodiments of the invention (e.g., the motor 40) can be reduced to 1/10 the size (or smaller) of the yokes of comparable conventional machines (e.g., the motor 20). Correspondingly, core loses for embodiments of the invention can also potentially be reduced to 1/10 (or less) of core losses of comparable conventional machines. This, in turn, can further enable the operation of embodiments of the invention at relatively high frequencies. In this light, and in contrast to conventional designs, embodiments of the invention that employ air-gap winding in the stator can benefit significantly from the elimination of stator teeth and the associated iron losses that dominate at high frequencies, leading to improved magnetic loading of the machines.

Figure 3A:
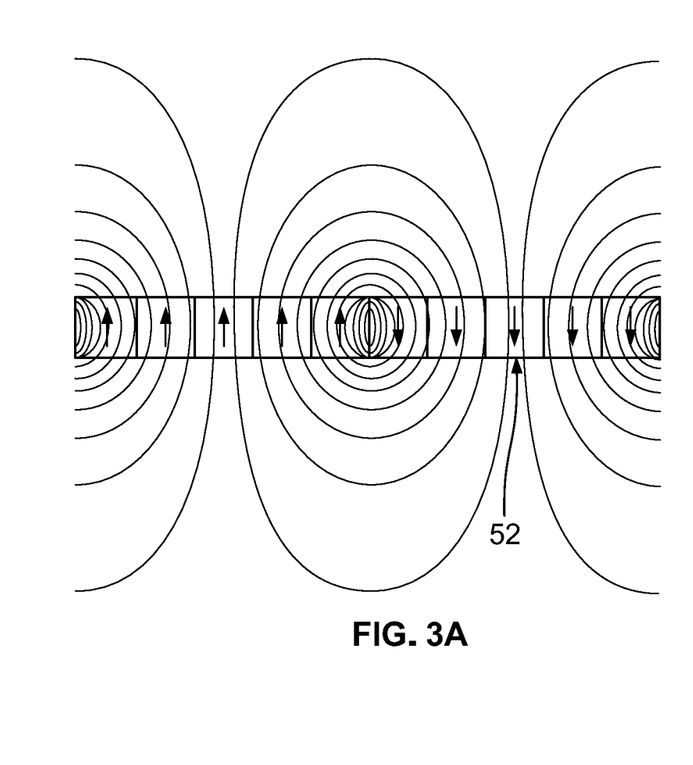
FIGS. 3A and 3B are, respectively, schematic views of a conventional permanent magnet array, and a permanent magnet array employed in motors according to some embodiments of the invention.
Figure 3B:
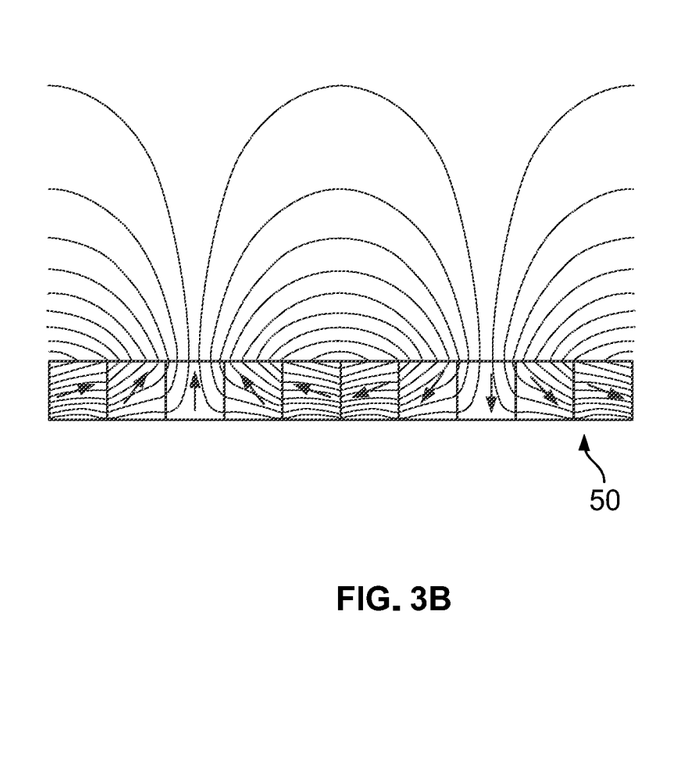

Some embodiments can also (or alternatively) utilize other technologies to similar (and, in some cases, interrelated) effect. As illustrated in FIG. 3B, for example, some embodiments can achieve still further weight savings through the use of a Halbach array 50 of non-rare-earth magnets, which can be supported by relatively thin composite (or other) retaining rings on a rotor such as the rotor 44 (not shown in FIG. 3B). As illustrated in FIG. 3A, conventional arrays 52 of magnets for motors (e.g., such as in the rotor 22 of FIG. 1A) can include magnets that are exclusively oriented radially inward or outward, in order to establish appropriate flux density in the relevant air-gap. This arrangement can require a significant amount of iron, in order to appropriately retain the flux (e.g., in a back yoke of a rotor). In contrast, with magnets arranged in a Halbach array, such as the array 50 illustrated in FIG. 3B, the magnetic flux can be canceled on one side, thereby eliminating (or at least reducing) the need for a relatively thick (and heavy) iron yoke. In some embodiments of the invention, as noted above, this can allow for a rotor (or other) yoke of a motor to be formed with a relatively thin profile and, in some embodiments, out of relatively light material (e.g., carbon fiber or other composite materials). In some embodiments, a rotor yoke can exhibit an optimum radial thickness of approximately 0.25 inches, potentially in combination with a stator yoke radial thickness optimized to approximately 0.5 inches, with an active length for both of approximately 8 inches.

In some embodiments, including for the automotive applications, the significant reduction (e.g., virtual elimination) of iron and of the related core losses that can arise at high frequencies (e.g., as discussed above), can result in motor efficiency that can exceed 97%, not including mechanical losses. Notably, in some cases, the principles of air-core topology disclosed herein can also significantly reduce (e.g., virtually eliminate) magnet losses, thereby also reducing thermal management challenges at high frequency.

In some cases, the benefits of certain concepts discussed above may need to be balanced against countervailing considerations, including possibilities of higher flux leakage, reduced electromagnetic coupling between the rotor and the stator, and potentially higher AC losses. For example, particularly at higher motor speeds, non-negligible efficiency losses can occur through AC current losses in copper and through losses resulting from any remaining iron in the machine, (e.g., via eddy currents). AC losses in copper may need to be addressed in particular for designs without stator teeth (e.g., as in the motor 40 of FIGS. 1B and 2B), due to the placement of armature windings in the path of the main flux of the relevant machines.

An appropriate balancing of these considerations (and others) can be addressed by certain design considerations disclosed herein, including, for example, the use of high frequency form-wound coils that are manufactured to include high thermal conductivity or high magnetic permeability (i.e. low magnetic reluctance) fillers. In some embodiments, for example, armature windings can be formed using a method of producing compacted Litz wire that is impregnated with high thermal conductivity resins (or other fillers) and, in some cases, appropriate particles.

In some aspects, Litz wire can be particularly well suited for use in high frequency machines. For example, as operating frequency increases, in order to keep losses in copper winding minimal, copper strands may be required to be relatively fine (e.g., 0.1-0.2 mm), so that induced eddy currents in the copper may be kept relatively small. Further, the copper strands may need to be transposed in multiple ways in order to distribute current uniformly within the relevant cable. Litz wire, which divides each phase winding into high number of smaller-diameter conductors in parallel, can satisfy these and other considerations.

Purely conventional approaches to Litz wire, however, may not be entirely optimal in the context of some embodiments of the invention. For example, conventional Litz wire arrangements may be formed from only about 25-30% copper, with other materials or air making up the rest of the composition. Additionally, voids or air gaps within the Litz wire can create thermal insulation, making it difficult to conduct heat away from the area and increasing the operating temperature and limiting the allowable currents through the conductor.

Further, in many designs, Litz wire may be located in armature windings between the rotor and the stator. This can create a large reluctance gap, or "magnetic gap," in the back of the armature windings, such as between the permanent magnets on the rotor and any steel in the stator. The amount of magnetic flux that can be driven by a given amount of magnets or other excitation source is inversely proportional to the air gap, so machines with relatively large flux may require relatively powerful magnets. Accordingly, in many conventional motor designs that use airgap windings, relatively powerful—and relatively heavy—rare-earth magnets may be required to overcome the magnetic gaps created by Litz wire windings.

In some embodiments of the invention, a back-filling approach can be adopted to overcome these (and other) challenges, aiming to optimize (e.g., maximize) the amount of copper present in a given geometry while also appropriately addressing issues relating to magnetic gaps. For example, in some implementations, during execution of a production process for a motor, wire can be wound using a mold (e.g., a mold 60 of FIG. 4A) into appropriate windings (e.g., windings 62 of FIG. 4B), with the windings being impregnated with iron or ceramic filled resins. This can beneficially create a composite structure of a high fill-factor electrical conductor, high thermal conductivity, and/or higher magnetic permeability with minimal voids and air-pockets. Once the windings have been impregnated with appropriate particles, the assembly can be cured within a mold (e.g., the winding mold 60) to obtain a structurally sound winding with optimal electrical, magnetic, thermal and mechanical properties that can then be assembled within the machine.

In different implementations, different winding techniques may be employed. For example, some implementations can employ lap winding and some implementations can employ wave winding.

As wire is wound into coils, it may be useful to compresses the copper strands into a relatively tight package. However, it may also be important to compress the copper strands into a cable without introducing internal short circuits.

In this regard, in order to further protect against internal short circuits, a particular application of insulation layers can be employed as part of the manufacturing process. For example, it may be useful to select and apply layers of insulation that provide an appropriate combination of features including electrical insulation, porosity, pliability, and thinness. For turn insulation, in particular, it may be useful to use materials that they have the dielectric capability to withstand required turn-to-turn voltages, but also exhibit appropriate structural compliance. In some cases, it may also be useful to select appropriately porous material, in order to allow penetration of high thermal conductivity resin (or other fillers).

Figure 5:
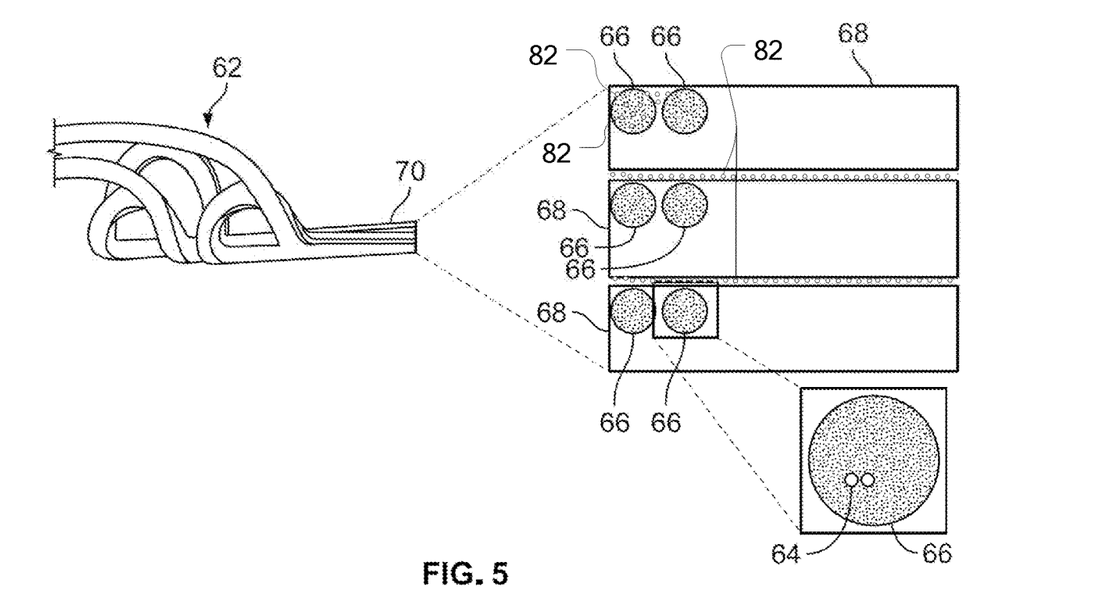
FIG. 5 is a perspective and schematic view of aspects of an armature winding according to an embodiment of the invention.
Figure 6:
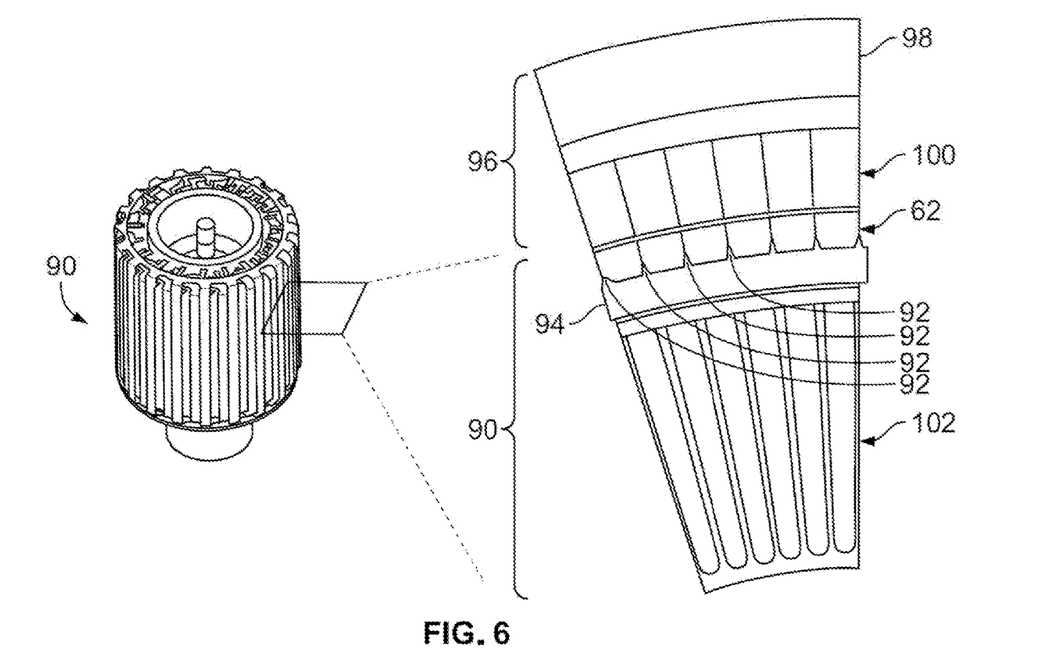
FIG. 6 is a perspective and schematic view of a stator assembly according to an embodiment of the invention.

An example application of insulation according to the invention is illustrated in FIG. 5. (For convenience of presentation, only a subset of wire strands and bundles are illustrated in FIG. 5). In the implementation illustrated, the windings 62 are fundamentally formed from single strands 64 of copper, which are insulated with single polyimide insulation. A number of the insulated strands 64 (e.g., 44 in total, each of size 38 AWG) are then collected into a bundle 66 that is coated with single Nomex® insulation or other flame-resistant material (e.g., other meta-aramid materials). (Nomex is a registered trademark of E. I. du Pont de Nemours and Company or its affiliates in the United States and/or other jurisdictions.) Sets of the bundles 66 (e.g., in groups of 15) are then collected together to form turns 68, which are insulated with glass fiber tape. Finally, the turns 68 can be used to form cables 70, for the windings 62 (or other windings) for use in a particular machine.

In some embodiments, it may be useful to utilize insulation with the properties indicated in the following table:

| Insulator Type | Material | Thickness | Dielectric Strength | Breakdown Voltage | Temperature Class |
| --- | --- | --- | --- | --- | --- |
| Strand | Polyimide | 0.5 mil | 7700 V · mil$^{-1}$ | 3850 V | Class H (220° C.) |
| Bundle | Nomex | 5 mil | 715 V · mil$^{-1}$ | 3580 V | Class H (220° C.) |
| Turn | Glass Fiber | 7 mil | 715 V · mil$^{-1}$ | 5000 V | Class H (220° C.) |

In some embodiments, insulation with other properties can alternatively (or additionally) be used.

As also noted above, in some implementations, once the cables 70 (or other parts of a winding) have been formed, the cables 70 (or other parts) can be filled with nanoparticle resins. For example, in some embodiments, the cables 70 can be filled with thermally conductive, electrically resistive potting compound that includes 30% to 70% ceramic (or other) nanoparticles, by volume. Once cured, the nanoparticle resin can provide high thermal conductivity and improved structural integrity, as may usefully prevent cracks from forming or propagating in the cables. This can generally help to maintain efficiency and reliable performance throughout the life of the motor.

Figure 4A:
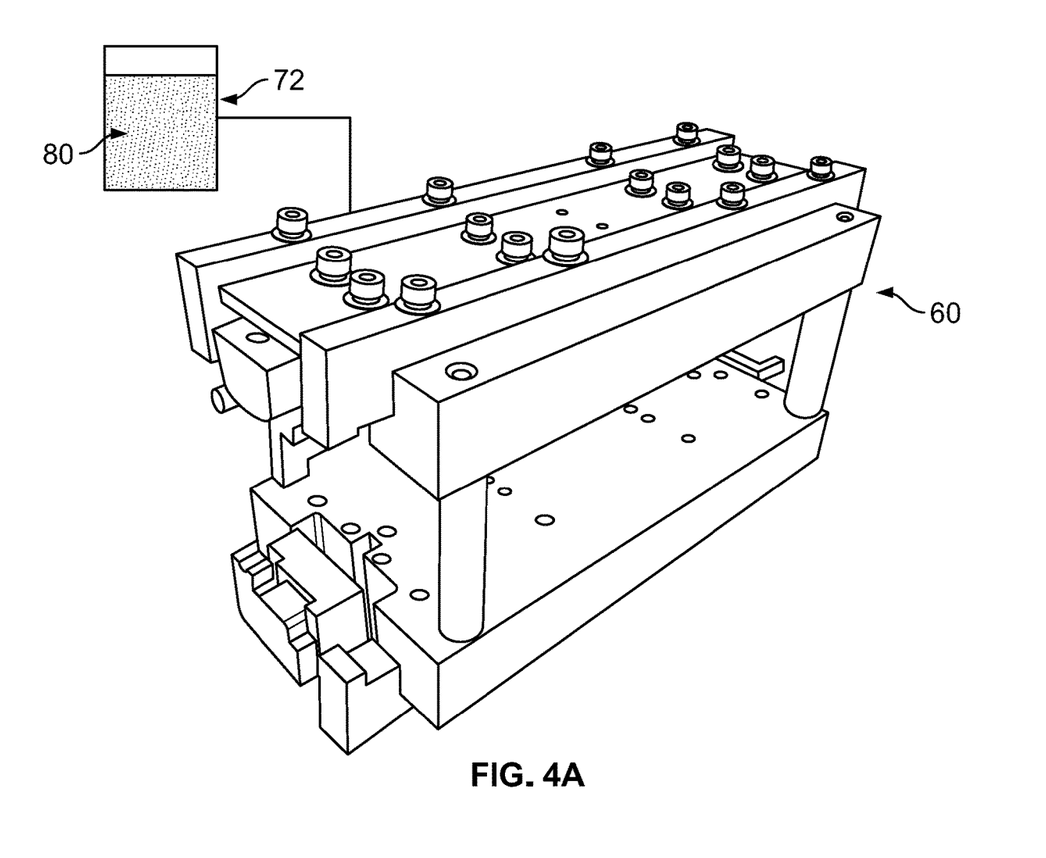
FIGS. 4A and 4B are, respectively, perspective views of a mold for winding coils during a manufacturing process according to an embodiment of the invention, and a finished armature winding prepared with the such a process.

In some cases, in order to ensure appropriate penetration of nanoparticle resin into the cables 70, a specialized process can be employed. For example, the resin can be heated (or otherwise processed) to achieve an appropriately low viscosity, then introduced (e.g., injected) into the relevant cable 70. Further, the cable can be heated (e.g., placed in a heated compartment) to an appropriate temperature (e.g., 20° C.) for an appropriate time (e.g., several minutes), thereby allowing the resin to appropriately wick into gaps within the cable. As appropriate, excess resin to enable this wicking can be provided in a separate reservoir, such as an elevated, heated reservoir 72 containing a particle-laden resin 80, as illustrated in FIG. 4A. Once wicking has advanced to an appropriate stage, the cable can then be brought to the relevant cure temperature (e.g., 120° C.) to cure the resin, with particles 82 from the resin 80 embedded inside (see FIG. 5). (The particles 82 are not illustrated to scale in FIG. 5 and for convenience of representation, only a partial spatial distribution of the particles 82 is represented. Further, the spatial density of the particles 82 as a group is presented as an example only. Other spatial densities are possible, depending on the character of the resin 80, the manufacturing process, and other factors.)

Once copper-resin cables have been appropriately formed and cured, they can then be used as coils for a relevant machine. For example, using a mold such as the mold 60 of FIG. 4A, the copper cables 70, including the many insulated copper strands 64 and the nanoparticle resin, can be formed into a defined coil geometry. The resulting coils can then be stacked together to form the armature windings (e.g., the windings 62, as partially illustrated in FIG. 4B). In some cases, the mold 60 can be precision machined to ensure the relevant coils meet appropriate dimensional tolerances (e.g. less than 5 thousandths of an inch), and can also include a provision (e.g., the reservoir 72 and associated injection equipment (not shown)) for extra resin to back fill the mold as the resin wicks into the coils as it is warmed up.

In some implementations, resin or insulation can be added in different ways or at different times. For example, in some cases, nanoparticle resin can be applied during wire preparation, before winding. During winding additional resin can then, as appropriate, be applied between turns, with glass fiber tape or other insulation wrapped around the middle (or other) turns, as appropriate.

Figure 4B:
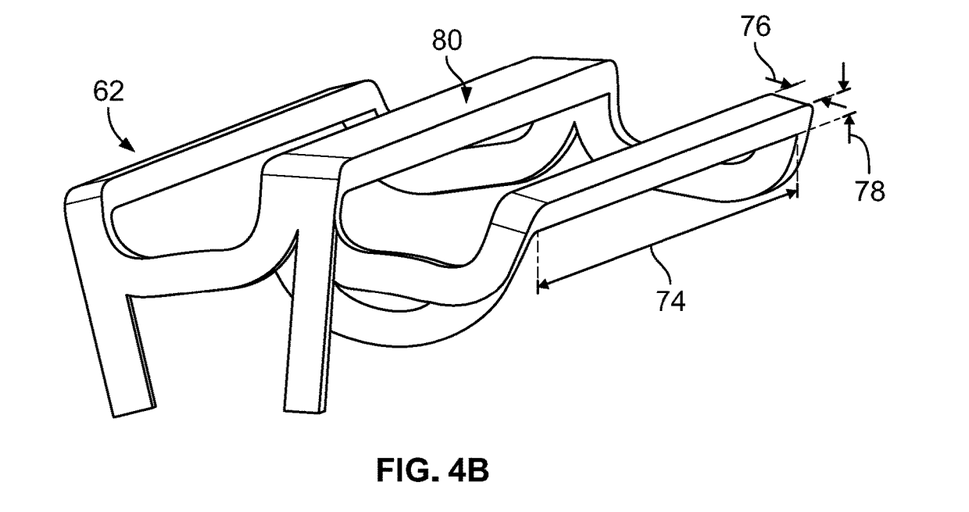

As also noted above, an example configuration of a winding is illustrated by the windings 62 of FIG. 4B. In the illustrated configuration, Litz wire cables have been formed into a series winding using a concentric winding design with three turns. In particular, the windings 62 illustrated in FIG. 4B have been impregnated with particles via the resin 80, and exhibits dimensions including an axial length 74 of 9.48±0.1 inches, a peripheral width 76 of 0.265+0.00/−0.005 inches, and a radial height 78 of 0.205±0.005 inches. Structurally, the illustrated windings 62 can be configured to sustain a shear stress of up to hundreds of psi against the relevant yoke, and about 10-100 psi against turns within the winding. In other embodiments, other geometries are possible, including other dimensions and other winding patterns. For example, some embodiments can exhibit radial heights of between approximately 0.197 inches and approximately 0.236 to provide optimal balance between increased rated power and appropriate heat management.

In some embodiments, iron particles can be included in the nanoparticle resin that is used to fill one or more of the motor windings, such as the resin 80 for the windings 62. In some embodiments, iron particles can be used along with other particles (e.g., ceramic particles), or in replacement of other particles. Usefully, in some embodiments, the dispersal of iron particles through the cables used to provide the armature windings can act to reduce the magnetic reluctance across the airgap winding. This, in turn, can provide generally increased magnetic permeability to the motor, with concordant benefits.

In some cases, impregnation of armature windings with iron particles can be of particular benefit for high frequency machines. For example, as discussed above, some embodiments of high frequency machines can benefit from the elimination of stator teeth and other iron, due to the reduction in associated iron losses, which can otherwise form a substantial part of total system losses at high frequencies. This can generally lead to improved magnetic loading of the relevant machines. However, elimination of the stator teeth can result in a relatively large magnetic gap (i.e., a large magnetic reluctance), which can require relatively powerful—and relatively heavy—rare-earth magnets to drive the required magnetic fields. By impregnating armature windings with iron (e.g., via injection of resins with iron particles), a relatively low reluctance can be achieved across the armature windings, thereby effectively reducing the magnetic gap. This, in turn, can facilitate the use of relatively less powerful—and relatively lighter—permanent magnets, including non-rare-earth (e.g., ferrite) magnets.

In some cases, replacing rare-earth magnets (e.g., NdFeB magnets) with non-rare-earth magnets (e.g., ferrites) can lead to a reduction in specific power. However, embodiments of the invention can still provide competitively sized, superior efficiency motors relative to conventional designs.

In view of the discussion above, it is noted that construction of some embodiments of the invention can proceed in a manner that is generally opposite of approaches for conventional motor designs. For example, in conventional motor designs, as partly illustrated in FIG. 1A, substantial (e.g., radially thick) steel structures are built for the rotor and the stator, and copper and magnets are deployed within and around these structures, as needed. In contrast, in embodiments of the invention, an example of which is partly illustrated in FIG. 1B, only a thin shell (e.g., a composite shell) may support an array of magnets. Further, with regard to the stator, the copper of the armature winding forms the primary structure, with steel, in the form of iron particles, being used to fill in the gaps.

In part due to the high pole count of motors and the lack of stator 'teeth' to define the path for the magnetic field according to some embodiments of the invention, it can be relatively important to locate coils on a stator with appropriate precision. For example, with a set of 120 coils, arranged equidistantly around a 360 degree stator, each coil cross-section may span only 3 degrees. Accordingly, even an error in placement of ±1 degree (or less) can result in relatively substantial effects. Further, with sufficiently misaligned placement, detrimental effects such as torque ripples can significantly impact the operation of the relevant machine.

Figure 7:
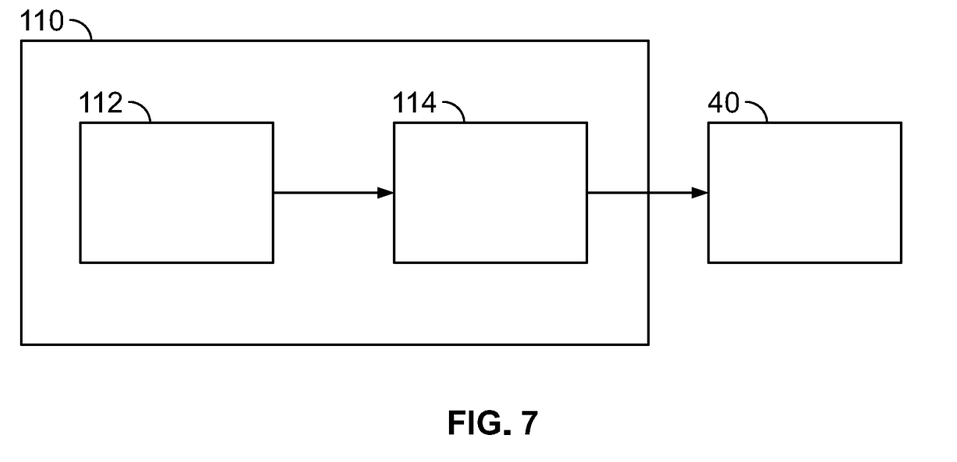
FIG. 7 is a schematic view of a control system for a motor according to an embodiment of the invention.

In view of these considerations, it may accordingly be useful to control the dimensions of the relevant coils to tight tolerances (e.g., as described above). It may also be useful to provide indexing or alignment features to assist in appropriate placement of coils within a machine. As illustrated in FIG. 7, for example, for a stator 90 according to an embodiment of the invention, a set of alignment ridges 92 are provided on (e.g., formed onto) a relevant surface of a relatively thin iron stator yoke 94. Using the ridges 92 (or other similar features), appropriately precise alignment of coils (e.g., of the windings 62) can be achieved with relatively high reliability. In other embodiments, other arrangements to assist with alignment are possible, including sloping surfaces (not shown), grooves (e.g., inverted ridges) (not shown), and so on.

FIG. 7 also illustrates other aspects that can be enabled by the innovative approaches detailed herein. For example, a rotor 96 can include a relatively thin composite retaining ring 98, along with a Halbach array 100 of permanent ferrite magnets, as generally discussed above. In particular, the use of the relatively thin composite construction for the ring 98 can be facilitated by the ability to use relatively light (e.g., non-rare-earth) magnets in the array 100. As a further benefit, a finned heat sink 102 is provided within the stator 90 in a space that, in conventional designs, would at least partly be required for the relatively large stator yoke. In other embodiments, other arrangements and benefits are possible.

In some embodiments, the yoke 94 of the motor illustrated in FIG. 7 may exhibit additional beneficial properties. In some embodiments, for example, the yoke 94 can be formed from a powder metal composite material, such as Ancor-Lam® or other high-density soft magnetic material (e.g., other iron-powder composite material). (AncorLam is a registered trademark of Hoeganaes Corp. in the United States and/or other jurisdictions.) In some embodiments, the yoke 94 can additionally (or alternatively) include embedded, or otherwise attached, relatively high thermal conductivity plates (e.g., of metal or ceramic), in order to improve heat transfer from the coils to the heat sink.

It will be noted that FIGS. 7 and 1B illustrate opposite configurations with respect to the illustrated rotors 22, 96 and stators 28, 90. For example, in FIG. 7, the stator assembly is internal, with the rotor assembly being external. In contrast, in FIG. 1B, the rotor assembly is internal, with the stator assembly being external. It will be understood, unless otherwise specified herein for particular configurations, that aspects of the invention discussed with regard to either one of these general configurations can generally be apply equally (albeit, in some cases, geometrically inversely) with regard to the other.

In some embodiments, reducing weight by removing iron (e.g., via the approaches described above) can further introduce additional countervailing considerations, including considerations relative to speed and frequency control. In conventional designs, for example, field weakening can be used to enable relatively high operational speeds. However, due to the reduction in iron in some embodiments of the invention, field weakening may not necessarily represent an optimal control strategy.

Generally, during normal operation, an electric motor can generate a counter-electromotive force ("back EMF") that opposes the intended voltage-driven rotation of the motor. This can result in relatively high demands on control systems. For example, if motor speed is doubled with constant flux, Faraday's law indicates that induced voltage will double. Accordingly, if current in the motor is to remain constant, twice the original voltage will be required in order to overcome the resulting back EMF. With field weakening, current can be driven through the armature windings in order to create a magnetic flux that opposes flux from the magnets of the machine, thereby lowering net flux in the machine and allowing the rotor to spin faster for a given power input.

In order for field weakening to be effective, a relatively high inductance (and low magnetic reluctance) within a machine may be required. However, due to the reduced amount of iron employed, and the significantly smaller pole span, machines according to some embodiments of the invention can exhibit relatively low reactance. While this can provide advantages for dynamic performance, it can result in relatively poor applicability for conventional field weakening techniques.

Accordingly, in embodiments in which reduction of the amount of iron used is a relatively high priority, it may be appropriate to employ one or more other control methods. For example, as illustrated in FIG. 7, an example embodiment of the invention can be driven by a control system 110 that includes a modular two stage converter. In particular, a boost converter 112 can be configured to provide variable DC power to a reconfigurable multi-level inverter 114, which can, in turn, be configured to provide power to a machine designed according to aspects of the invention (e.g., a high frequency, air-core motor such as the motor 40 of FIG. 1B). Generally, the control system 110, or other similarly configured systems, can be operated without employing field weakening, and can accommodate a wide range of back-EMF without increasing the size of the whole system.

In some embodiments, a modular, reconfigurable inverter topology can be used to obtain relatively high operating voltages without the need to use an inverter with much higher kVA rating than the motor. For example, a control system such as the control system 110 can include number of modules configured to be connected in parallel when low voltage, high current is provided (e.g. in relatively low speeds) and reconnected in series when high voltage low current is required (e.g. in high speed).

In some embodiments, during operation of the control system 110, or other control systems according to the invention, the DC voltage of the inverter 114 is allowed to increase as the relevant machine speeds up, and the inverter 114 supplies the required high voltage to the motor without the input voltage to the converter 112 being impacted. With this configuration the voltage swing that may result from the lack of field weakening control in the motor can be contained to the motor-converter package.

In some embodiments, similar (or other) approaches may also be employed, including approaches utilizing a floating DC bus architecture (not shown), dynamic reconnection of armature windings (i.e., effectively running several windings in series at low speed and windings in parallel at high speed) (not shown), or a high frequency, reconfigurable drive to obtain inversely proportional voltage relative to current (e.g., 3× voltage at ⅓ current) (not shown). Indeed, in this regard, in the absence of the use of field weakening, there is potential for embodiments of the invention to exhibit superior efficiency relative to conventional machines, including across large speed ranges and, in some cases, at constant power.

Figure 8A:
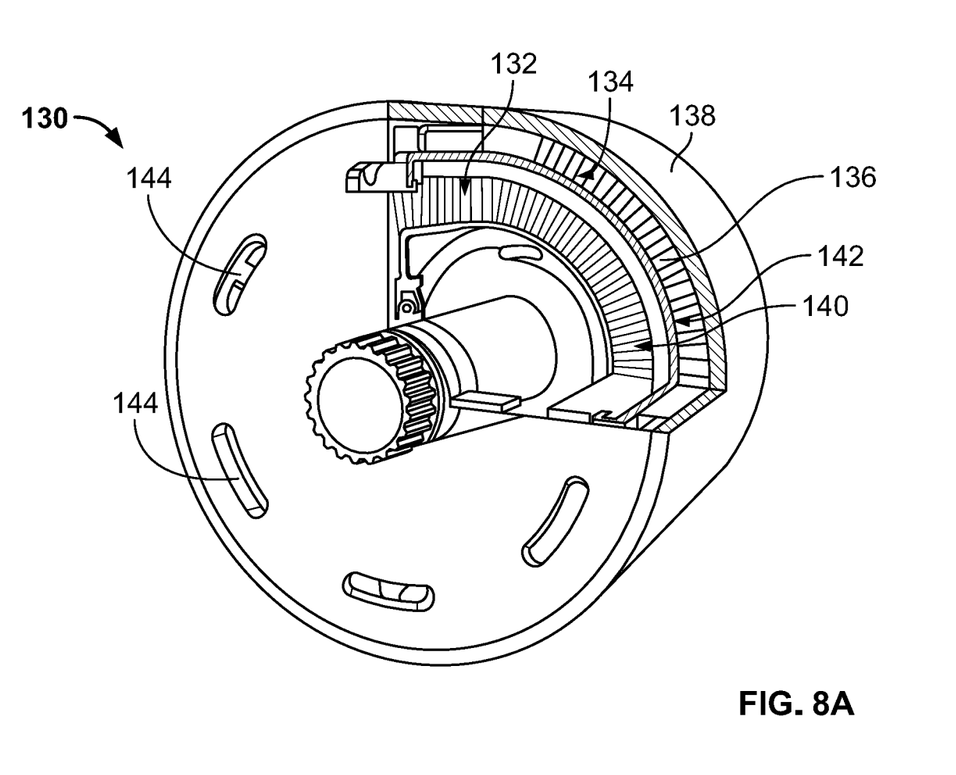
FIG. 8A is a perspective, partial sectional of a motor according to an embodiment of the invention.
Figure 8B:
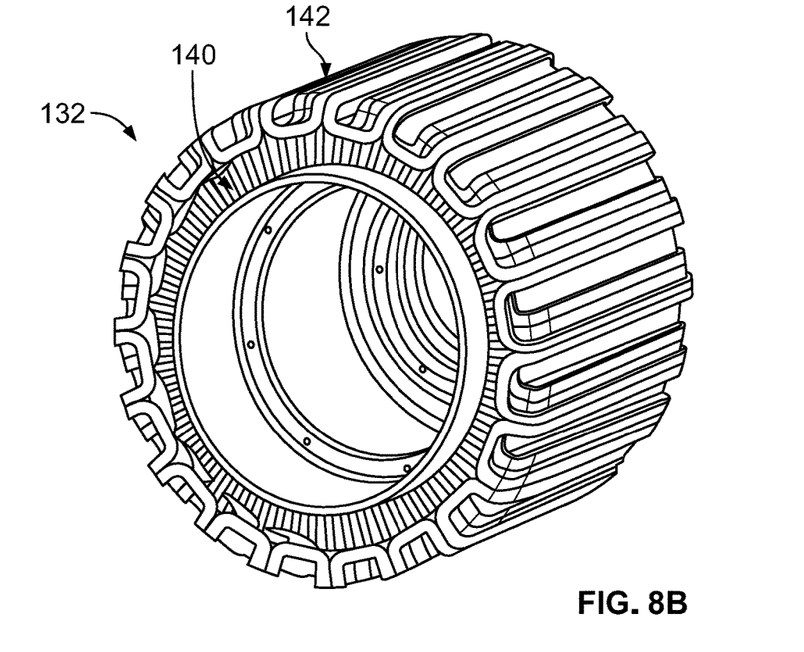
FIG. 8B is a perspective view of a stator of the motor of FIG. 8A.

In some embodiments, motors according to the invention can be particularly well suited for aircraft applications. For example, FIG. 8A illustrates a motor 130 according to an embodiment of the invention, configured as a relatively lightweight, 3 kHz, 18,000 rpm, 1 MW motor that is configured to drive a turbofan (not shown in FIG. 8A) of an electric aircraft. Using concepts disclosed herein, for example, the motor 130 can exhibit significantly reduced material use as compared to conventional designs, particularly with regard to ferromagnetic steel and copper, and can achieve specific power of over 8 hp/lb at 98% efficiency. In some embodiments, the motor illustrated in FIG. 8A can be driven by a high frequency, integrated, optimized modular inverter with wide band-gap devices (e.g., as described above).

In the embodiment illustrated, the motor 130 is configured with a radially internal stator 132 and a radially external rotor 134. The rotor 134 exhibits a surface mount design, with a Halbach magnet array 136 supported on a relatively thin composite retaining ring 138. In other embodiments, other configurations are possible.

Figure 8C:
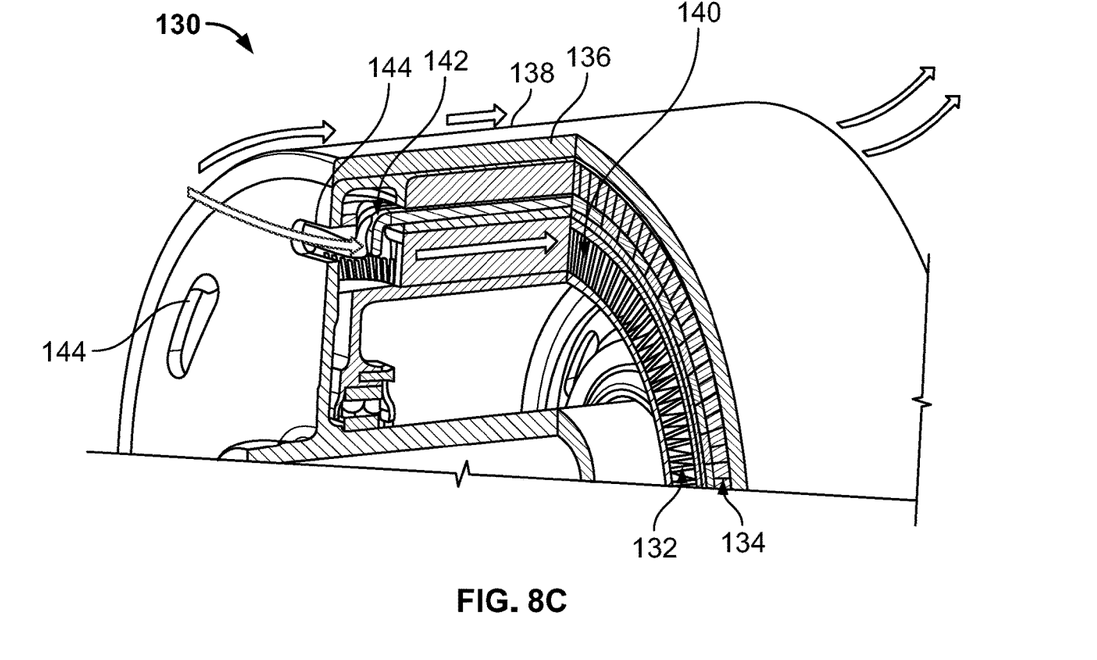
FIG. 8C is a perspective, partial sectional view of the motor of FIG. 8A, and heat transfer flows for the motor.

FIG. 8C illustrates certain additional advantages of some configurations of the motor 130. For example, a finned heat sink 140 is disposed on the stator 132 radially inward from windings 142. Further, inlet ports 144 are provided at a front end of a casing of the motor 130, in conjunction with outlet ports (not shown) at a rear end of the casing. During operation of the motor (e.g., as the relevant aircraft taxies or flies), external air can flow through the ports 144 and then through the heat sink 140, in order to cool the motor 130. In some arrangements, this internal cooling can provide cooling of the motor 130 of substantially greater magnitude than flow around the exterior of the retaining ring 138. Particularly in combination with the embedding of ceramic or iron particles in the windings 142 (e.g., as described above), the illustrated arrangement (and other similar arrangements) can result in relatively efficient cooling of the system as a whole. For example, in some embodiments, it may be possible for the operating frequency to exceed 10 kHz, at current densities approaching 10 A/mm$^2$, while limiting stator heat flux to less than 10 W/in$^2$ (i.e., within the operating capacity of conventional and other cooling systems).

In some embodiments, the motor 130 can include a composite overwind to hold the magnetic components in place during high speed rotational operation. In some cases, this overwind can be implemented in-situ, as this can allow for the use of the composite to create a compressive pre-stress that can allow the structure to better handle the applied loads. In some embodiments, for example, appropriate overwinding can enable the use of composite rotors with operational speeds of 40,000 rpm and higher.

In other embodiments, other configurations can be employed while still providing for appropriate heat transfer rates. For example, in transportation (e.g., automotive) and other applications, embodiments of the motor may benefit from oil spray cooling. This may be particularly effective for some embodiments, for example, due to the increased exposure of copper for heat transfer that may result from the reduction (e.g., elimination) of structural iron.

The use of high frequency designs according to embodiments of the invention can also offer geometrical advantages relative to conventional electric motors. For example, some embodiments of a high frequency motor according to the invention may be very thin radially, resembling large ring shapes that are hollow in the middle (e.g., as illustrated in FIG. 1B). In some embodiments, this geometry may be particularly useful for particular applications. For example, rather than employing a conventional shafted motor design to transfer torque from a particular electric motor to a particular driven device, it may be possible to connect the rotor itself (e.g., directly) to the device for torque transfer without requiring a separate shaft.

Figure 9:
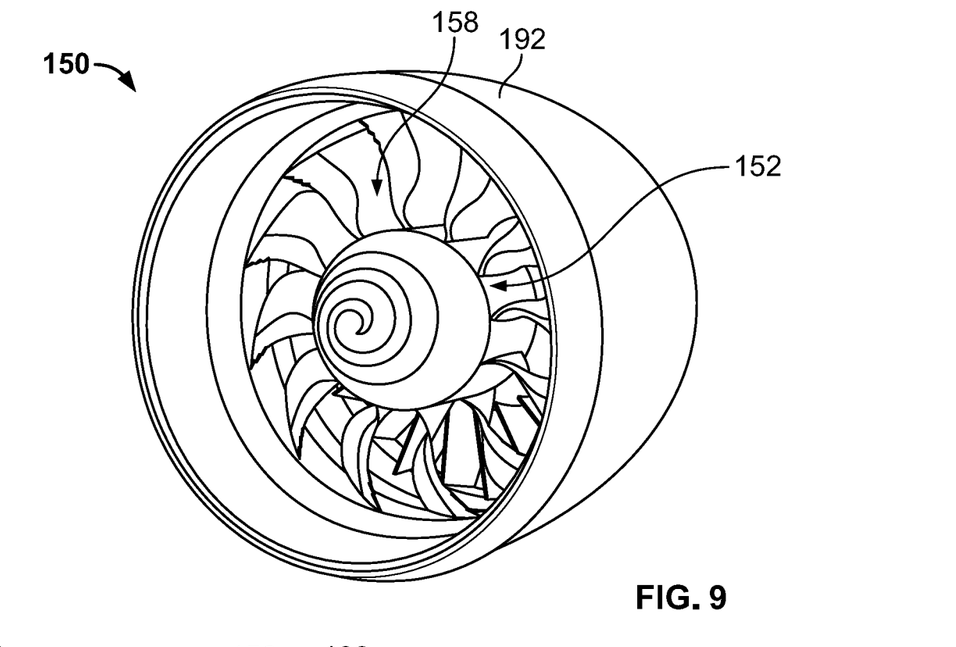
FIG. 9 is a perspective view of an aircraft propulsion fan according to an embodiment of the invention.
Figure 10:
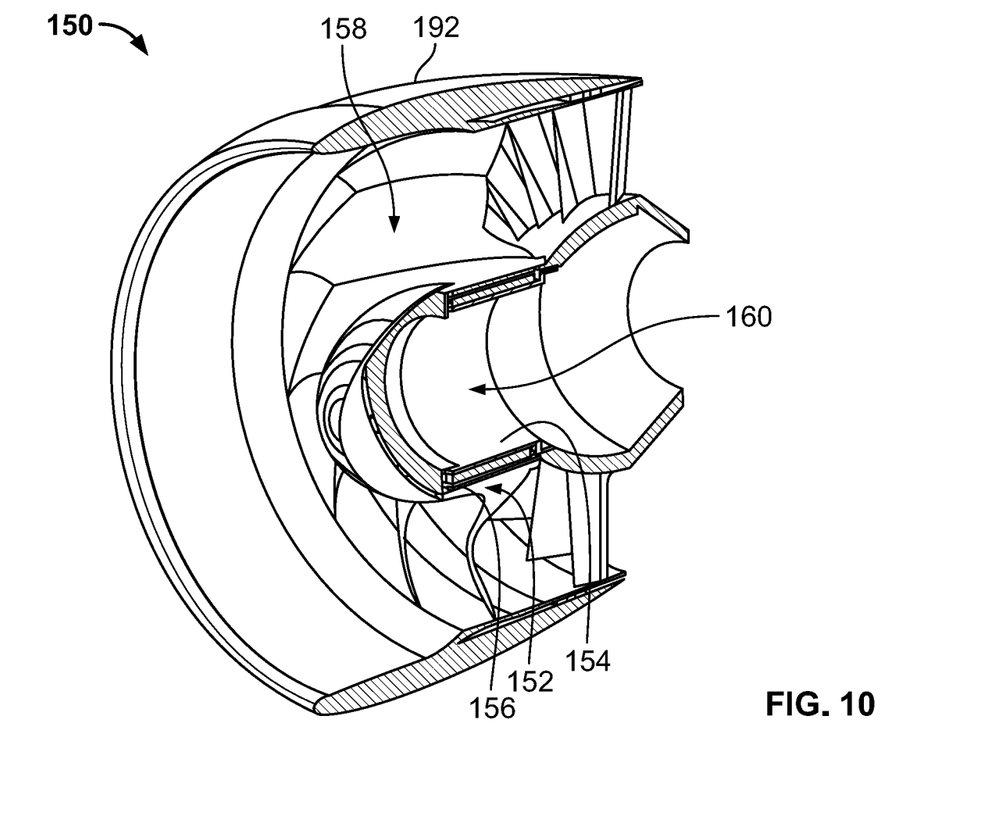
FIG. 10 is a sectional view of the propulsion fan of FIG. 9.

As one example, as illustrated in FIGS. 9 and 10, a turbofan 150 can include a central motor 152 configured according to an embodiment of the invention. In particular, in the embodiment illustrated, the motor 152 is configured with an internal stator 154 and an external rotor 156 to which blades 158 of the turbofan 150 are directly secured. In this setting, not only can the improved efficiency and power density of the motor 152 be beneficial, but open internal space 160 that is provided by the design of the motor 152 can allow for placement of additional heat transfer equipment inside of the motor 152. For example, additional heat sinks (not shown in FIGS. 9 and 10) can be installed radially within the stator 154 and a portion of air flowing through the turbofan 150 diverted to flow through the motor 152 and across the heat sinks, Additionally, direct attachment of the blades 158 to the rotor 156 can eliminate the need for a separate coupling and allow thrust bearings to be integrated into the motor 152, while the concordant elimination of the relatively low efficiency inner blade portions (i.e., to provide space for the motor 152) may have relatively little effect on overall system performance.

Additionally, in some embodiments, in contrast to conventional designs, the motor 152 can be extended over a substantial portion of the axial length of the turbofan 150. With conventional designs, for example, although increasing motor size can increase efficiency, it also corresponds to a substantial increase in weight, which may generally prevent substantial increases in motor size for some applications (e.g., aviation). In contrast, due to the reduced-weight aspects of embodiments of the invention, as also discussed above, the motor 152 can be extended over a significant axial distance, to significantly increase motor efficiency, without significantly increasing overall system weight.

Figure 11:
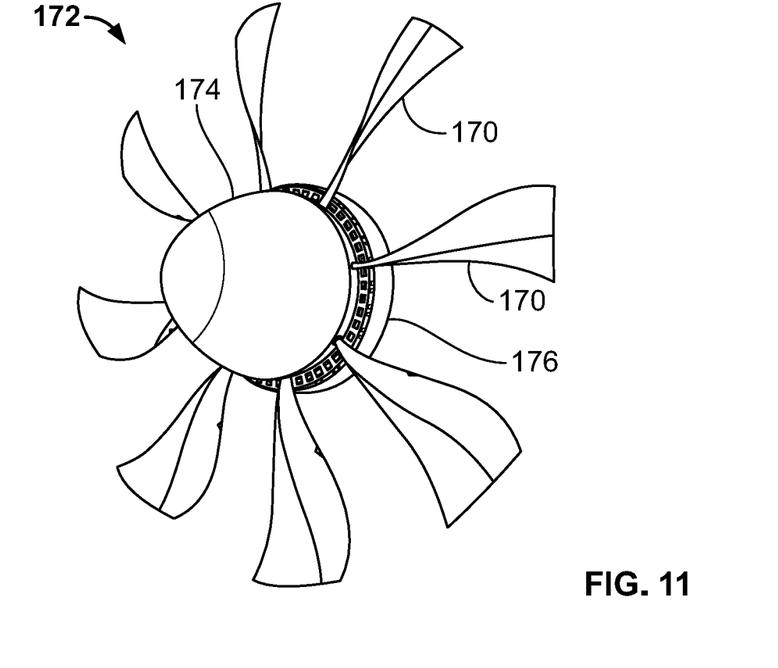
FIG. 11 is a perspective view of an aircraft propeller assembly according to an embodiment of the invention.

As another example, as illustrated in FIG. 11, blades 170 of an aerospace propeller 172 (or other fan arrangement) can be attached to a hub 174 that is itself directly attached to a rotor of a motor 176 according to the invention. Similar benefits and modifications as discussed above with regard to the turbofan 150 can also be obtained in this configuration.

Figure 12:
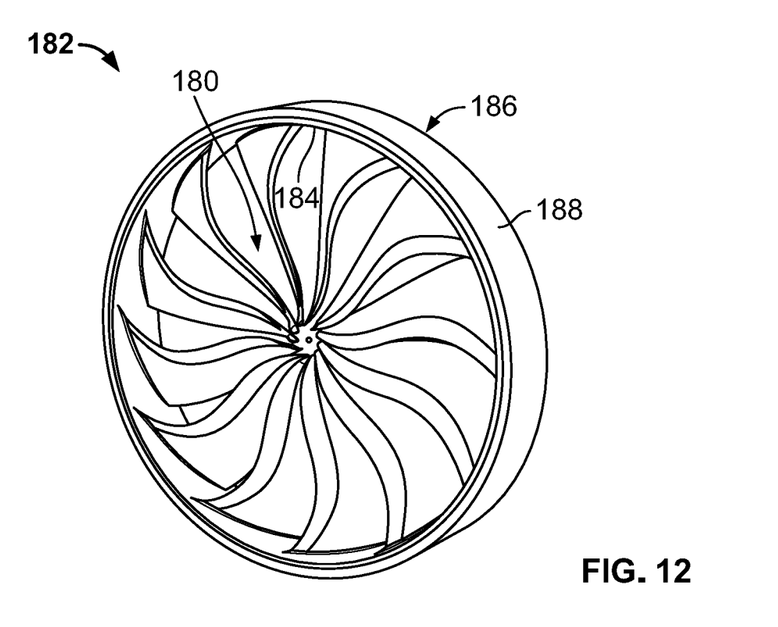
FIG. 12 is a perspective view of a propulsion fan assembly according to an embodiment of the invention.
Figure 13:
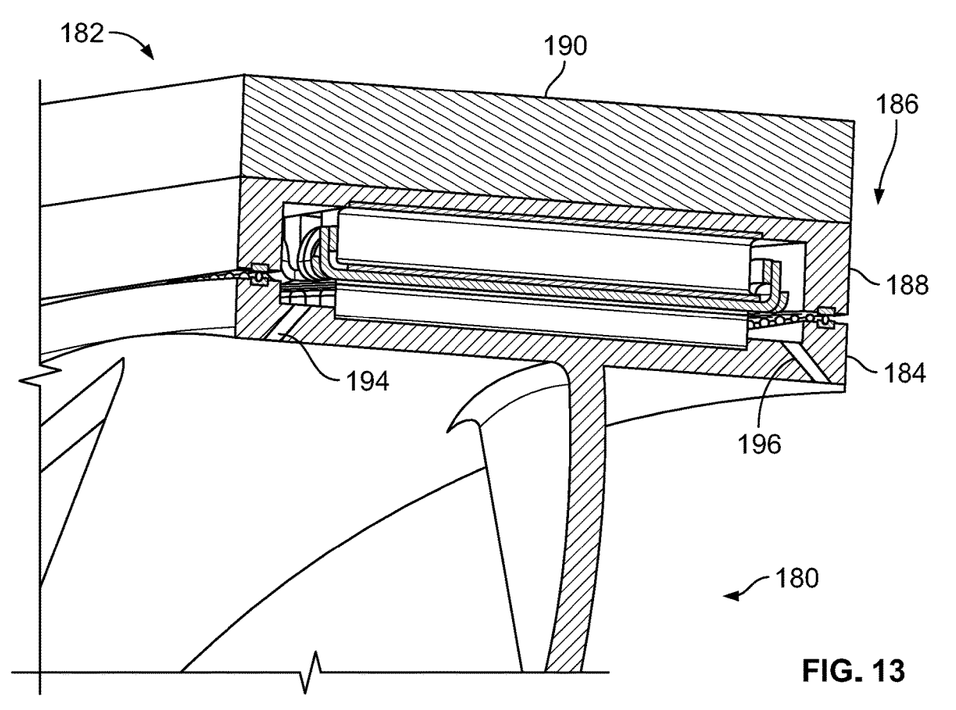
FIG. 13 is a perspective, sectional, partial view of the propulsion fan assembly of FIG. 12.

In some embodiments, including those configured for use with a turbofan (e.g., for aerospace applications), a rotor can be configured with a diameter of comparable (e.g., equivalent) diameter to a casing of the turbofan. As illustrated in FIGS. 12 and 13, for example, an outer diameter of a blade assembly 180 for a turbofan 182 can be secured to an inner diameter of a rotor 184 of a motor 186 according to an embodiment of the invention. Further, in some embodiments, a stator 188 of the motor 186 can be directly secured to, or even integrated with, a nacelle of the turbofan 182. The nacelle, a portion 190 of which is shown in FIG. 13, can be configured, for example, similarly to a nacelle 192 of the turbofan 150 of FIG. 10.

Generally, similar benefits to those discussed above can be obtained with regard to the motor 186 and the turbofan 182. For example, the motor 186 can be readily configured to extend axially over a substantial part (e.g., all) of the nacelle, in order to obtain relatively high motor efficiency with relatively little corresponding increase in system weight. Further, in some embodiments, heat transfer can be significantly approved relative to conventional designs. For example, an extended axial length of the motor 186 can generally provide improved heat transfer from external air flow, while air flow driven by the turbofan 182 (or otherwise) can also be routed through feature such as inlet and outlet ports 194, 196 in order to cool the internal components of the motor 186.

Figure 14:
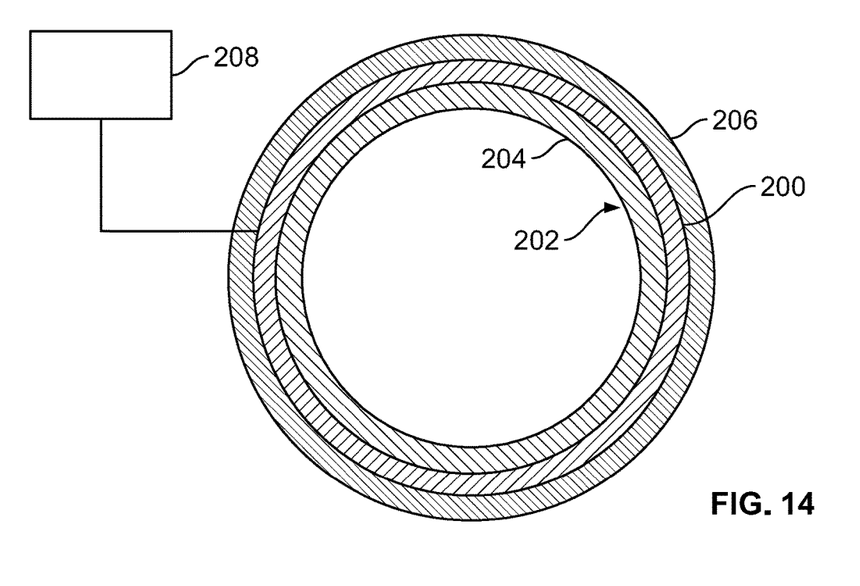
FIG. 14 is a schematic view of an electrical machine embedded within a vehicle wheel according to an embodiment of the invention.

The reduced weight and other benefits of embodiments of the invention can also be beneficially adapted for traction-based transportation (e.g., automotive) applications. For example, for in-wheel designs, in which an electrical machine is embedded within a vehicle wheel, the reduced weight of embodiments of the invention, relative to conventional designs, can usefully help to reduce the unsprung mass of the relevant vehicle. For example, as illustrated in FIG. 14, a configuration similar to that of FIG. 10 can be employed, with a rotor 200 of a motor 202 to the radial exterior of a stator 204 of the motor 202. In contrast to the configuration of FIG. 10, however, the rotor 200 can be directly secured to a rim 206 of a wheel of a traction vehicle. As in other similar configurations discussed above, for example, this configuration can result in improved rotor dynamic performance, reduced loads on bearings, and generally improved system lifespan. In some cases, this benefit can be even further accentuated by the placement of a motor drive (e.g., control electronics 208) on the chassis of the relevant vehicle (not shown), such that the weight of the drive does not contribute to the unsprung mass of the vehicle.

Thus, embodiments of the invention provide for improved electric motors and associated (e.g., control) systems, as well as related manufacturing and operating methods. In some embodiments, for example, use of the disclosed approaches can significantly lower weight relative to conventional designs, as well as improving operational characteristics at higher frequencies.

The included description of the disclosed embodiments is provided to enable any person skilled in the art to make or use the invention. Various modifications to these embodiments will be readily apparent to those skilled in the art, and the generic principles defined herein may be applied to other embodiments without departing from the spirit or scope of the invention. Thus, the invention is not intended to be limited to the embodiments shown herein but is to be accorded the widest scope consistent with the principles and novel features disclosed herein.

What is claimed is:

1. A motor system comprising:
    an electric motor that includes:
        a stator including a plurality of air-gap wound coils supported by a yoke; and
        a rotor including a permanent magnet array;
        the air-gap wound coils being form-wound with stranded conductors impregnated with a resin containing a plurality of particles such that the plurality of particles are embedded within the stranded conductors;
    wherein the plurality of particles include at least one of a plurality of ceramic nanoparticles or a plurality of iron particles
    wherein the air-gap wound coils include Litz wire cables impregnated with the resin, the Litz wire cables including:
        a plurality of wire strands insulated with polyimide insulation;
        a plurality of bundles of the wire strands, the bundles being insulated with flame-resistant meta-aramid material; and
        a plurality of turns formed from the bundles, the turns being insulated with glass fiber tape.

2. The motor system of claim 1, wherein the plurality of particles includes a plurality of ceramic nanoparticles.

3. The motor system of claim 1, wherein the plurality of particles includes a plurality of iron particles.

4. The motor system of claim 1, wherein the yoke is a non-laminated powder metal composite ring.

5. The motor system of claim 1, wherein the permanent magnet array is a Halbach array of non-rare-earth metal magnets.

6. The motor system of claim 1, wherein the plurality of particles form between 30% and 70% of the resin, by volume.

7. The motor system of claim 1, further comprising:
    a turbofan assembly that includes a plurality of blades;
    wherein the blades are directly secured to the rotor.

8. The motor system of claim 7, wherein the rotor is disposed radially to an interior of the stator.

9. The motor system of claim 8, wherein the stator is integrated into a nacelle of the turbofan assembly.

10. The motor system of claim 7, wherein the rotor is disposed radially to an exterior of the stator; and
    wherein a shaftless cavity is defined within the stator.

11. The motor system of claim 1, wherein the rotor is secured to a wheel rim of a traction vehicle.

12. The motor system of claim 1 wherein the electric motor is configured to be mounted within a wheel of a vehicle.

13. The motor system of claim 12 further comprising:
    a control system mounted to the vehicle so as not to be included in the unsprung mass of the vehicle;
    wherein the control system includes a boost converter, and a reconfigurable multilevel inverter.

14. The motor system of claim 13, wherein the control system includes a two-stage converter with a floating DC bus architecture.

15. The motor system of claim 13, wherein the control system is configured to include a modular, reconfigurable inverter topology.

16. A motor system comprising:
    an electric motor that includes:
        a stator including a plurality of air-gap wound coils supported by a yoke; and
        a rotor including a permanent magnet array;
        the air-gap wound coils being form-wound with stranded conductors impregnated with a resin containing a plurality of particles;
        the plurality of particles including at least one of a plurality of ceramic nanoparticles or a plurality of iron particles;
    wherein the air-gap wound coils include Litz wire cables impregnated with the resin, the Litz wire cables including:
        a plurality of wire strands insulated with polyimide insulation;
        a plurality of bundles of the wire strands, the bundles being insulated with flame-resistant meta-aramid material; and
        a plurality of turns formed from the bundles, the turns being insulated with glass fiber tape.

17. The motor system of claim 16, wherein the electric motor is configured to be controlled by a motor control system including:
    a boost converter; and
    a reconfigurable multilevel inverter;
    the boost converter being connected to the reconfigurable multilevel inverter to provide variable DC power; and
    the reconfigurable multilevel inverter being connected to the electric motor to provide controllable voltage and current.

* * * * *